No. 736,838. Patented August 18, 1903.

UNITED STATES PATENT OFFICE.

HARRY W. GANDER, OF RUDY, PENNSYLVANIA.

WOOD-PRESERVATIVE.

SPECIFICATION forming part of Letters Patent No. 736,838, dated August 18, 1903.

Application filed June 22, 1903. Serial No. 162,651. (No specimens.)

*To all whom it may concern:*

Be it known that I, HARRY W. GANDER, a citizen of the United States, residing at Rudy, in the county of Montgomery and State of Pennsylvania, have invented certain new and useful Improvements in Wood-Preservatives, of which the following is a specification.

This invention has for its object to increase the life of wood and to prevent the fouling of the bottom of ships and water-craft having a wooden hull.

In preparing the compound the following ingredients are employed in about the proportions stated: linseed-oil, one gallon; powdered alum, three ounces; powdered charcoal, twelve ounces; varnish, one-half pint; turpentine, one-half pint; alcohol, one gill.

The above-mentioned ingredients are thoroughly mixed, and the resultant mixture is applied to the surface to be protected after the same has been thoroughly cleaned and dried by means of a brush. After the first application has become dry a second coat is applied in a similar way and allowed to dry. The article thus treated will have its period of usefulness materially increased, and ships' bottoms coated therewith will not foul.

Having thus described the invention, what is claimed as new is—

The wood-preservative composed of linseed-oil, powdered alum, powdered charcoal, varnish, turpentine and alcohol in about the proportions substantially as herein set forth.

In testimony whereof I affix my signature in presence of two witnesses.

HARRY W. GANDER. [L. S.]

Witnesses:
H. B. UPDEGROVE,
W. S. SLOTTERER.